(12) United States Patent
Fattal et al.

(10) Patent No.: US 10,969,531 B2
(45) Date of Patent: Apr. 6, 2021

(54) MICROPRISM MULTIBEAM ELEMENT BACKLIGHT AND MULTIVIEW DISPLAY USING SAME

(71) Applicant: LEIA INC., Menlo Park, CA (US)

(72) Inventors: David A. Fattal, Mountain View, CA (US); Xuejian Li, Menlo Park, CA (US); Ming Ma, Mountain View, CA (US); Sonny Vo, Menlo Park, CA (US)

(73) Assignee: LEIA INC., Menlo Park, CA (US)

( * ) Notice: Subject to any disclaimer, the term of this patent is extended or adjusted under 35 U.S.C. 154(b) by 0 days.

(21) Appl. No.: 16/714,772

(22) Filed: Dec. 15, 2019

(65) Prior Publication Data
US 2020/0116918 A1   Apr. 16, 2020

Related U.S. Application Data

(63) Continuation of application No. PCT/US2017/038600, filed on Jun. 21, 2017.

(51) Int. Cl.
*F21V 8/00* (2006.01)

(52) U.S. Cl.
CPC .................... *G02B 6/0036* (2013.01)

(58) Field of Classification Search
CPC ............... G02B 6/0035; G02B 6/0036
See application file for complete search history.

(56) References Cited

U.S. PATENT DOCUMENTS

| | | | |
|---|---|---|---|
| 5,396,350 | A | 3/1995 | Beeson et al. |
| 7,671,935 | B2 * | 3/2010 | Mather ............... H04N 13/312 349/65 |
| 9,128,226 | B2 | 9/2015 | Fattal et al. |
| 9,201,270 | B2 | 12/2015 | Fattal et al. |

(Continued)

FOREIGN PATENT DOCUMENTS

| | | |
|---|---|---|
| WO | 2017039756 A1 | 3/2017 |
| WO | 2018208309 A1 | 11/2018 |

OTHER PUBLICATIONS

International Search Report and Written Opinion (ISRWO) by International Searching Authority (ISA) Korean Intellectual Property Office (KIPO), dated Apr. 11, 2018 (13 pages) for counterpart parent International Application No. PCT/US2017/038600.

*Primary Examiner* — Robert J May
(74) *Attorney, Agent, or Firm* — J. Michael Johnson

(57) ABSTRACT

A multiview backlight and a multiview display employ a microprism multibeam element to emit a plurality of directional light beams having principal angular directions corresponding to view directions of the multiview display. The multiview backlight includes a light guide and the microprism multibeam element extending from a surface of the light guide. The microprism multibeam element has an input aperture configured to receive a portion of guided light and an output aperture configured to emit the plurality of directional light beams. The microprism multibeam element includes a microprism having an inclined sidewall configured to reflect the received guided light portion and provide the plurality of directional light beams. The multiview display includes the multiview backlight and an array of multiview pixels configured to provide different views of the multiview display from the plurality of directional light beams.

21 Claims, 8 Drawing Sheets

(56) References Cited

U.S. PATENT DOCUMENTS

| | | |
|---|---|---|
| 9,298,168 B2 | 3/2016 | Taff et al. |
| 9,389,415 B2 | 7/2016 | Fattal et al. |
| 9,459,461 B2 | 10/2016 | Santori et al. |
| 9,557,466 B2 | 1/2017 | Fattal |
| 9,785,119 B2 | 10/2017 | Taff et al. |
| 10,798,371 B2 | 10/2020 | Fattal |
| 2002/0093607 A1 | 7/2002 | Van De Ven et al. |
| 2006/0262376 A1 | 11/2006 | Mather et al. |
| 2007/0296877 A1 | 12/2007 | Kang |
| 2008/0084708 A1 | 4/2008 | Lee et al. |
| 2008/0309849 A1 | 12/2008 | Yang |
| 2012/0008067 A1 | 1/2012 | Mun et al. |
| 2018/0011237 A1 | 1/2018 | Fattal |
| 2018/0196194 A1 | 7/2018 | Fattal |
| 2018/0306965 A1 | 10/2018 | Fattal |
| 2019/0025494 A1 | 1/2019 | Fattal et al. |
| 2019/0155105 A1 | 5/2019 | Aieta et al. |

\* cited by examiner

MICROPRISM MULTIBEAM ELEMENT BACKLIGHT AND MULTIVIEW DISPLAY USING SAME

CROSS-REFERENCE TO RELATED APPLICATIONS

This application is a continuation patent application of and claims the benefit of priority to International Application No. PCT/US2017/038600, filed Jun. 21, 2017, the entirety of which is incorporated by reference herein.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example. Alternatively, the various colors may be implemented by field-sequential illumination of a display using different colors, such as primary colors.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a microprism multibeam element and a multiview backlight using the microprism multibeam element, the multiview backlight having application to a multiview or three-dimensional (3D) display. In particular, embodiments consistent with the principles described herein provide a multiview backlight employing microprism multibeam elements configured to provide a plurality of directional light beams having different principal angular directions from one another. Directional light beams of the directional light beam plurality may have directions corresponding to view directions of a multiview display, for example. Further, the microprism multibeam elements each comprise one or more microprisms having an inclined sidewall(s) with an inclination angle. The microprism multibeam elements are configured to provide the directional light beam plurality by receiving light coupled out of a light guide of the multiview backlight and reflecting the received, coupled-out light at an interior surface of the inclined sidewall, according to various embodiments. Uses of multiview displays employing the multiview backlight described herein include, but are not limited to, mobile telephones (e.g., smart phones), watches, tablet computes, mobile computers (e.g., laptop computers), personal computers and computer monitors, automobile display consoles, cameras displays, and various other mobile as well as substantially non-mobile display applications and devices. Moreover, employing microprism multibeam elements may provide exceptional angular color uniformity, especially when a white light source is used to illuminate the multiview backlight.

According to various embodiments, the plurality of microprism multibeam elements protrude or extend from a top or 'emitting' surface of the light guide of the multiview backlight. Moreover, a material of the light guide may be contiguous with a material of the microprism multibeam elements at contact points between the microprism multibeam elements and the light guide, according to some embodiments. Further, according to various embodiments, the microprism multibeam elements may provide partial collimation the light beams or may at least modify an emission pattern of the light beams, including the principal angular directions of the directional light beams. In addition, a number of microprisms within the microprism multibeam elements may vary along a length of the light guide or equivalently along the multiview backlight to modulate a variation in a brightness of the light beams as a function of the length.

Figure 1A:
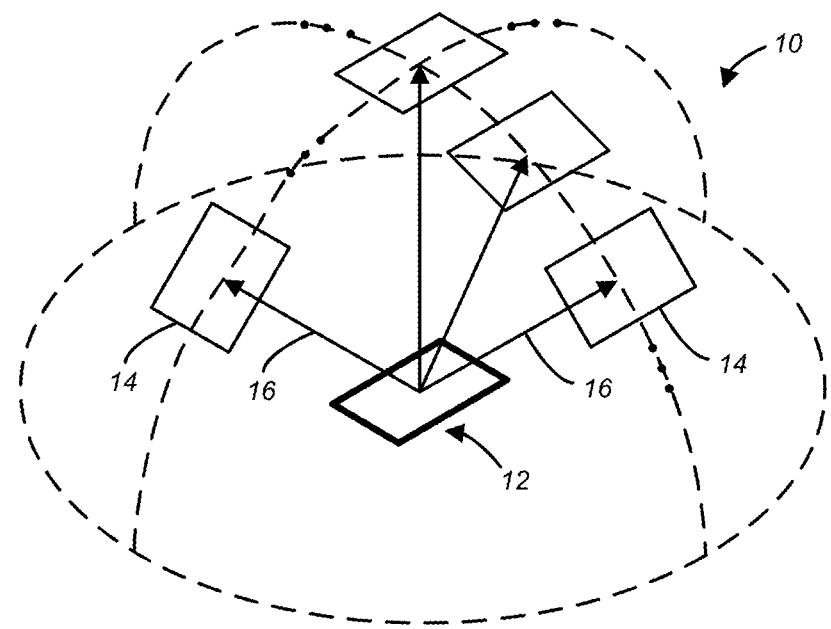
FIG. 1A illustrates a perspective view of a multiview display in an example, according to an embodiment consistent with the principles described herein.

Herein, a 'multiview display' is defined as an electronic display or display system configured to provide different views of a multiview image in different view directions. FIG. 1A illustrates a perspective view of a multiview display 10 in an example, according to an embodiment consistent with the principles described herein. As illustrated in FIG. 1A, the multiview display 10 comprises a screen 12 to display a multiview image to be viewed. The screen 12 may be a display screen of a telephone (e.g., mobile telephone, smart phone, etc.), a tablet computer, a laptop computer, a computer monitor of a desktop computer, a camera display, or an electronic display of substantially any other device, for example. The multiview display 10 provides different views 14 of the multiview image in different view directions 16 relative to the screen 12. The view directions 16 are illustrated as arrows extending from the screen 12 in various different principal angular directions with the different views 14 being illustrated as polygonal boxes at the termination of the arrows (i.e., depicting the view directions 16). Only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14.

A view direction or equivalently a light beam having a direction corresponding to a view direction of a multiview display generally has a principal angular direction given by angular components $\{\theta, \phi 5\}$, by definition herein. The angular component Bis referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
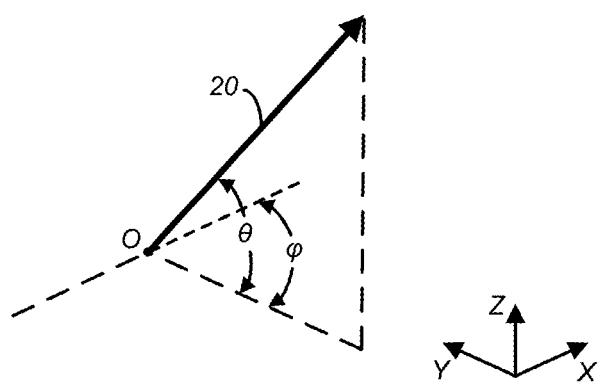
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (e.g., on a multiview display) as a stereoscopic pair of images by selecting only two of the multiview views to view at a time (e.g., one view per eye).

A 'multiview pixel' is defined herein as a set of sub-pixels representing 'view' pixels in each of a similar plurality of different views of a multiview display. In particular, a multiview pixel may have an individual sub-pixel corresponding to or representing a view pixel in each of the different views of the multiview image. Moreover, the sub-pixels of the multiview pixel are so-called 'directional pixels' in that each of the sub-pixels is associated with a predetermined view direction of a corresponding one of the different views, by definition herein. Further, according to various examples and embodiments, the different view pixels represented by the sub-pixels of a multiview pixel may have equivalent or at least substantially similar locations or coordinates in each of the different views. For example, a first multiview pixel may have individual sub-pixels corresponding to view pixels located at $\{x_1, y_1\}$ in each of the different views of a multiview image, while a second multiview pixel may have individual sub-pixels corresponding to view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels in associated with a multiview display having 64 different views. In another example, the multiview display may provide an eight by four array of views (i.e., 32 views) and the multiview pixel may include thirty-two 32 sub-pixels (i.e., one for each view). Additionally, each different sub-pixel may have an associated direction (e.g., light beam principal angular direction) that corresponds to a different one of the view directions corresponding to the 64 different views, for example. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. In various examples, the term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the plate light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to ensure that total internal reflection is maintained within the plate light guide to guide light.

By definition herein, a 'multibeam element' is a structure or element of a backlight or a display that produces light that includes a plurality of directional light beams. A 'microprism multibeam element,' in turn, is defined herein as a multibeam element comprising one or more microprisms, the one or more microprisms having an inclined sidewall, an interior surface of which is configured to reflect light. In particular, the microprism multibeam element is configured to receive light at or through an input aperture and to provide or 'emit' the plurality of directional light beams comprising the light reflected by the inclined sidewall(s) of the microprism(s) of the microprism multibeam element at an output aperture, by definition herein. In various embodiments, reflection of light may be provided at the output aperture by total internal reflection at the interior surface of the inclined sidewall(s). In some embodiments, the inclined sidewall may comprise a reflective layer or reflective material (e.g., a reflective material layer on an exterior surface of the sidewall). The reflective layer may be configured to provide or enhance reflection at the interior surface of the microprism.

In various embodiments, the microprism multibeam element is optically coupled or optically connected to a light guide of a backlight. Further, the microprism multibeam element is configured to receive light by coupling out a portion of light guided by the light guide. The light beams provide the directional light beams by coupling out or 'receiving' a portion of light guided in the light guide. The light beams of the plurality of light beams produced by a microprism multibeam element through reflection of the received guided light portion within the microprism have different principal angular directions from one another, by definition herein. As such, the light beams are referred to as 'directional' light beams herein. In particular, by definition, a directional light beam of the plurality of directional light beams has a predetermined principal angular direction that is different from a direction of other directional light beams of the directional light beam plurality.

According to some embodiments, the directional light beam plurality may represent a light field. For example, the directional light beam plurality may be confined to a substantially conical region of space or have a predetermined angular spread that includes the principal angular direction of the light beams in the light beam plurality. As such, the predetermined angular spread of the directional light beams in combination (i.e., the directional light beam plurality) may represent the light field.

According to various embodiments, the principal angular direction of the various directional light beams is determined by a characteristic including, but not limited to, a size (e.g., length, width, area, etc.) of the microprism multibeam element (such as a size of the output aperture of the microprism multibeam element or an aggregate size of a plurality of microprisms that make up the microprism multibeam element). In some embodiments, the microprism multibeam element may be considered an 'extended point light source' (i.e., a plurality of point light sources distributed across an extent of the microprism multibeam element), by definition herein. Further, a directional light beam produced by the microprism multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, a collimating diffraction grating, and various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). Similarly, a collimating lens may comprise a spherically shaped surface (e.g., a biconvex spherical lens).

In some embodiments, the collimator may be a continuous reflector or a continuous lens (i.e., a reflector or lens having a substantially smooth, continuous surface). In other embodiments, the collimating reflector or the collimating lens may comprise a substantially discontinuous surface such as, but not limited to, a Fresnel reflector or a Fresnel lens that provides light collimation. According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor $\sigma$ may specify that a majority of light rays in a beam of collimated light is within a particular angular spread (e.g., $+/-\sigma$ degrees about a central or principal angular direction of the collimated light beam). The light rays of the collimated light beam may have a Gaussian distribution in terms of angle and the angular spread be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., the light source may be configured to produce white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example.

Further, as used herein, the article 'a' is intended to have its ordinary meaning in the patent arts, namely 'one or more'. For example, 'a microprism multibeam element' means one or more microprism multibeam elements and as such, 'the microprism multibeam element' means 'the microprism multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 2A:
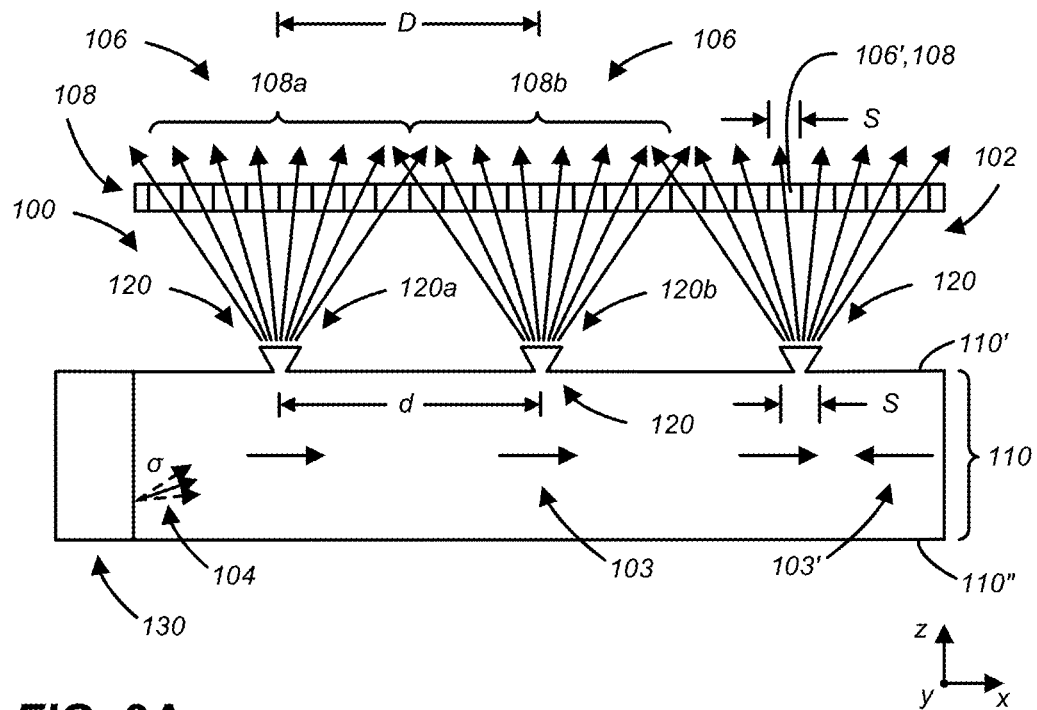
FIG. 2A illustrates a cross sectional view of a multiview backlight in an example, according to an embodiment consistent with the principles described herein.
Figure 2B:
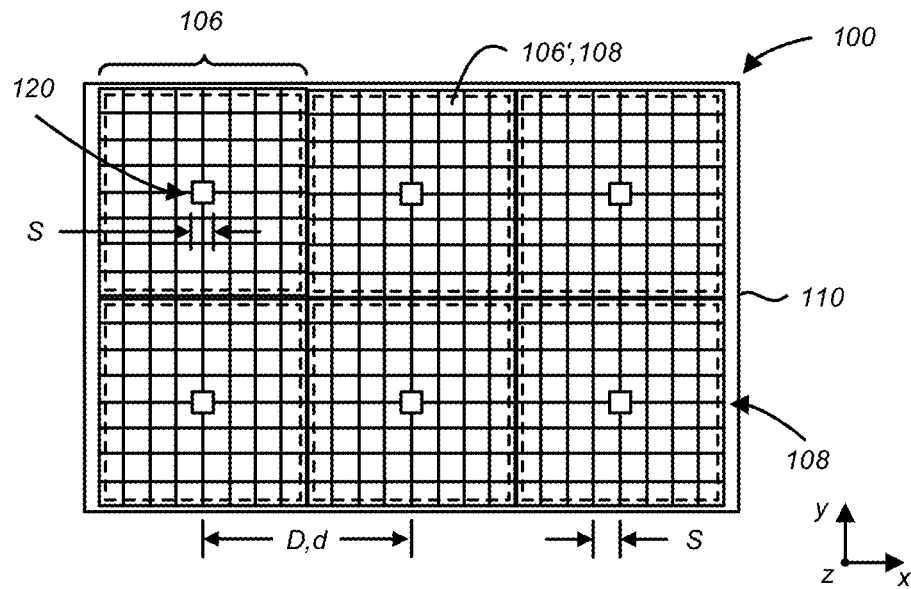
FIG. 2B illustrates a plan view of a multiview backlight in an example, according to an embodiment consistent with the principles described herein.
Figure 2C:
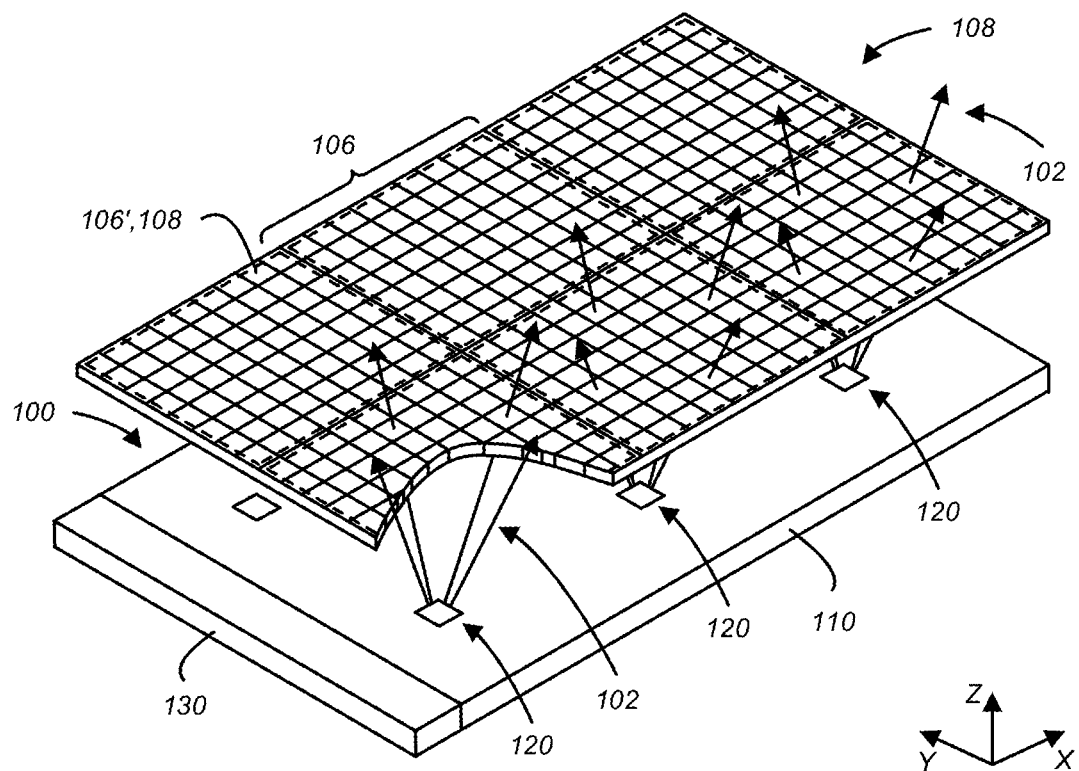
FIG. 2C illustrates a perspective view of a multiview backlight in an example, according to an embodiment consistent with the principles described herein.

According to some embodiments of the principles described herein, a multiview backlight is provided. FIG. 2A illustrates a cross sectional view of a multiview backlight 100 in an example, according to an embodiment consistent with the principles described herein. FIG. 2B illustrates a plan view of a multiview backlight 100 in an example, according to an embodiment consistent with the principles described herein. FIG. 2C illustrates a perspective view of a multiview backlight 100 in an example, according to an embodiment consistent with the principles described herein. The perspective view in FIG. 2C is illustrated with a partial cut-away to facilitate discussion herein only.

The multiview backlight 100 illustrated in FIGS. 2A-2C is configured to provide a plurality of coupled-out or directional light beams 102 having different principal angular directions from one another (e.g., as a light field). In particular, the provided plurality of directional light beams 102 are directed away from the multiview backlight 100 in different principal angular directions corresponding to respective view directions of a multiview display, according to various embodiments. In some embodiments, the directional light beams 102 may be modulated (e.g., using light valves, as described below) to facilitate the display of information having 3D content.

As illustrated in FIGS. 2A-2C, the multiview backlight 100 comprises a light guide 110. The light guide 110 may be a plate light guide 110, according to some embodiments. The light guide 110 is configured to guide light along a length of the light guide 110 as guided light 104. For example, the light guide 110 may include a dielectric material configured as an optical waveguide. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 110, for example.

In some embodiments, the light guide 110 may be a slab or plate optical waveguide comprising an extended, substantially planar sheet of optically transparent, dielectric material. The substantially planar sheet of dielectric material is configured to guide the guided light 104 using total internal reflection. According to various examples, the optically transparent material of the light guide 110 may include or be made up of any of a variety of dielectric materials including, but not limited to, one or more of various types of glass (e.g., silica glass, alkali-aluminosilicate glass, borosilicate glass, etc.) and substantially optically transparent plastics or polymers (e.g., poly(methyl methacrylate) or 'acrylic glass', polycarbonate, etc.). In some examples, the light guide 110 may further include a cladding layer (not illustrated) on at least a portion of a surface (e.g., one or both of the top surface and the bottom surface) of the light guide 110. The cladding layer may be used to further facilitate total internal reflection, according to some examples.

Further, according to some embodiments, the light guide 110 is configured to guide the guided light 104 (e.g., as a guided light beam) according to total internal reflection at a non-zero propagation angle between a first surface 110' (e.g., a 'top' or 'front' surface or side) and a second surface 110" (e.g., a 'bottom' or 'back' surface or side) of the light guide 110. In particular, the guided light 104 may propagate by reflecting or 'bouncing' between the first surface 110' and the second surface 110" of the light guide 110 at the non-zero propagation angle.

In some embodiments, the light guide 110 may be configured to 'recycle' the guided light 104. In particular, the guided light 104 that has been guided along the light guide length may be redirected back along that length in another propagation direction 103' that differs from the propagation direction 103. For example, the light guide 110 may include a reflector (not illustrated) at an end of the light guide 110 opposite to an input end adjacent to the light source. The reflector may be configured to reflect the guided light 104 back toward the input end as recycled guided light. Recycling guided light 104 in this manner may increase a brightness of the multiview backlight 100 (e.g., an intensity of the directional light beams 102) by making guided light 104 available more than once, for example, to microprism multibeam elements, described below.

Alternatively (e.g., as opposed to recycling guided light), guided light 104 propagating in the other propagation direction 103' may be provided by introducing light into the light guide 110 with the other propagation direction 103' (e.g., in addition to guided light 104 having the propagation direction 103). In FIG. 2A, a bold arrow indicating a propagation direction 103' of recycled guided light (e.g., directed in a negative x-direction) illustrates a general propagation direction of the recycled guided light within the light guide 110.

As illustrated in FIGS. 2A-2C, the multiview backlight 100 further comprises a microprism multibeam element 120 adjacent to and extending from a surface of the light guide 110. In particular, FIGS. 2a-2C illustrate a plurality of microprism multibeam elements 120 spaced apart from one another along the light guide length. The microprism multibeam elements 120 of the plurality are separated from one another by a finite space and represent individual, distinct elements along the light guide length. That is, by definition herein, the microprism multibeam elements 120 of the plurality are spaced apart from one another according to a finite (i.e., non-zero) inter-element distance (e.g., a finite center-to-center distance). Further the microprism multibeam elements 120 of the plurality generally do not intersect, overlap or otherwise touch one another, according to some embodiments. As such, each microprism multibeam element 120 of the plurality is generally distinct and separated from other ones of the microprism multibeam elements 120 of the microprism multibeam element plurality.

According to some embodiments, the microprism multibeam elements 120 of the plurality may be arranged in either a one-dimensional (1D) array or two-dimensional (2D) array. For example, the plurality of microprism multibeam elements 120 may be arranged as a linear 1D array. In another example, the plurality of microprism multibeam elements 120 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the microprism multibeam elements 120 may be substantially uniform or constant across the array. In other examples, the inter-element distance between the microprism multibeam elements 120 may be varied one or both of across the array and along the length of the light guide 110.

According to various embodiments and by definition, a microprism multibeam element 120 of the microprism multibeam element plurality comprises a microprism having an inclined sidewall. In some embodiments, the microprism multibeam element 120 may comprise a single microprism, while in other embodiments the microprism multibeam element 120 may comprise a plurality of microprisms. The microprism multibeam element 120 having one or more microprisms is configured to couple out or more generally receive a portion of the guided light 104. In particular, the portion of the guided light 104 may be extracted or coupled out at an optical connection between the microprism multibeam element and the light guide 110. A portion of the microprism multibeam element 120 at the optical connection may be referred to input or input aperture of the microprism multibeam element 120. The extracted or coupled-out portion of the guided light 104 is thus received by the microprism multibeam element 120 at or through the input or input aperture. In turn, the plurality of directional light beams 102 is provided at an output or output aperture of the microprism multibeam element 120.

Further, the directional light beam plurality is provided from the received guided light portion by reflecting the received portion of the guided light 104 at or from an interior surface the microprism multibeam element 120 or more precisely at or from an interior surface of the inclined sidewall of the microprism of the microprism multibeam element 120. FIGS. 2A and 2C illustrate the directional light beams 102 as a plurality of diverging arrows depicted as being directed way from the first (top or front) surface 110' of the light guide 110. Further, the directional light beams 102 are illustrated as being emitted from the microprism multibeam element 120 at the output aperture thereof.

According to various embodiments, a size of the microprism multibeam element 120 may be comparable to a size of a sub-pixel 106' (or equivalently a light valve) in a multiview pixel 106 of a multiview display, according to various embodiments. This configuration may provide an optimal or near optimal beam width or beam overlap of various directional light beams 102 used in a multiview display. The multiview pixels 106 are illustrated in FIGS. 2A-2C with the multiview backlight 100 for the purpose of facilitating discussion.

Herein, the 'size' may be defined in any of a variety of manners to include, but not be limited to, a length, a width or an area. For example, the size of a sub-pixel 106' may be a length thereof and the comparable size of the microprism multibeam element 120 may also be a length of the microprism multibeam element 120 (such as a length of the output aperture of the microprism multibeam element 120 or an aggregate length of a plurality of microprisms thereof). In another example, size may refer to an area such that an area of the microprism multibeam element 120 (such as an area of the aperture of the microprism multibeam element 120 or an aggregate area of a plurality of microprisms thereof) may be comparable to an area of the sub-pixel 106'.

In some embodiments, the size of the microprism multibeam element 120 is comparable to the sub-pixel size such that the microprism multibeam element size is between about fifty percent (50%) and about two hundred percent (200%) of the sub-pixel size. For example, if the microprism multibeam element size is denoted 's' and the sub-pixel size is denoted 'S' (e.g., as illustrated in FIG. 2A), then the microprism multibeam element size s may be given by equation (1) as $$\tfrac{1}{2}S \leq s \leq 2S \qquad (1)$$

In other examples, the microprism multibeam element size is greater than about sixty percent (60%) of the sub-pixel size, or about seventy percent (70%) of the sub-pixel size, or greater than about eighty percent (80%) of the sub-pixel size, or greater than about ninety percent (90%) of the sub-pixel size, and the microprism multibeam element 120 is less than about one hundred eighty percent (180%) of the sub-pixel size, or less than about one hundred sixty percent (160%) of the sub-pixel size, or less than about one hundred forty percent (140%) of the sub-pixel size, or less than about one hundred twenty percent (120%) of the sub-pixel size. For example, by 'comparable size', the microprism multibeam element size may be between about seventy-five percent (75%) and about one hundred fifty percent (150%) of the sub-pixel size. In another example, the microprism multibeam element 120 may be comparable in size to the sub-pixel 106' where the microprism multibeam element size is between about one hundred twenty-five percent (125%) and about eighty-five percent (85%) of the sub-pixel size. According to some embodiments, the comparable sizes of the microprism multibeam element 120 and the sub-pixel 106' may be chosen to reduce, or in some examples to minimize, dark zones between views of the multiview display, while at the same time reducing, or in some examples minimizing, an overlap between views of the multiview display.

FIGS. 2A-2C further illustrate an array of light valves 108 configured to modulate the directional light beams 102 of the directional light beam plurality. The light valve array may be part of a multiview display that employs the multiview backlight 100, for example, and is illustrated in FIGS. 2A-2C along with the multiview backlight 100 for the purpose of facilitating discussion herein. In FIG. 2C, the array of light valves 108 is partially cut-away to allow visualization of the light guide 110 and the microprism multibeam element 120 underlying the light valve array.

As illustrated in FIGS. 2A-2C, different ones of the directional light beams 102 having different principal angular directions are configured to pass through and may be modulated by different ones of the light valves 108 in the light valve array. Further, as illustrated, a light valve 108 of the array corresponds to a sub-pixel 106', and a set of the light valves 108 corresponds to a multiview pixel 106 of a multiview display. In particular, a different set of light valves 108 of the light valve array is configured to receive and modulate the directional light beams 102 from different ones of the microprism multibeam elements 120. That is, there is one unique set of light valves 108 for each microprism multibeam element 120, as illustrated. In various embodiments, different types of light valves may be employed as the light valves 108 of the light valve array including, but not limited to, one or more of liquid crystal light valves, electrophoretic light valves, and light valves based on electrowetting.

As illustrated in FIG. 2A, a first light valve set 108a is configured to receive and modulate the directional light beams 102 from a first microprism multibeam element 120a, while a second light valve set 108b is configured to receive and modulate the directional light beams 102 from a second microprism multibeam element 120b. Thus, each of the light valve sets (e.g., the first and second light valve sets 108a, 108b) in the light valve array corresponds, respectively, to a different multiview pixel 106. Further, individual light valves 108 of the light valve sets corresponding to the sub-pixels 106' of the respective multiview pixels 106, as illustrated in FIG. 2A.

Note that, as illustrated in FIG. 2A, the size of a sub-pixel 106' may correspond to a size (e.g., width) of a light valve 108 in the light valve array. In other examples, the sub-pixel size may be defined as a distance (e.g., a center-to-center distance) between adjacent light valves 108 of the light valve array. For example, the light valves 108 may be smaller than the center-to-center distance between the light valves 108 in the light valve array. The sub-pixel size may be defined as either the size of the light valve 108 or a size corresponding to the center-to-center distance between the light valves 108, for example.

In some embodiments, a relationship between the microprism multibeam elements 120 of the plurality and corresponding multiview pixels 106 (e.g., sets of light valves 108) may be a one-to-one relationship. That is, there may be an equal number of multiview pixels 106 and microprism multibeam elements 120. FIG. 2B explicitly illustrates by way of example the one-to-one relationship where each multiview pixel 106 comprising a different set of light valves 108 is illustrated as surrounded by a dashed line. In other embodiments (not illustrated), the number of multiview pixels 106 and microprism multibeam elements 120 may differ from one another.

In some embodiments, an inter-element distance (e.g., center-to-center distance) between a pair of adjacent microprism multibeam elements 120 of the plurality may be equal to an inter-pixel distance (e.g., a center-to-center distance) between a corresponding adjacent pair of multiview pixels 106, e.g., represented by light valve sets. For example, as illustrated in FIG. 2A, a center-to-center distance d between the first microprism multibeam element 120a and the second microprism multibeam element 120b is substantially equal to a center-to-center distance D between the first light valve set 108a and the second light valve set 108b. In other embodiments (not illustrated), the relative center-to-center distances of pairs of microprism multibeam elements 120 and corresponding light valve sets may differ, e.g., the microprism multibeam elements 120 may have an inter-element spacing (i.e., center-to-center distance d) that is one of greater than or less than a spacing (i.e., center-to-center distance D) between light valve sets representing multiview pixels 106.

Further (e.g., as illustrated in FIG. 2A), each microprism multibeam element 120 is configured to provide directional light beams 102 to one and only one multiview pixel 106, according to some embodiments. In particular, for a given one of the microprism multibeam elements 120, the directional light beams 102 having a principal angular direction in a view of the multiview display are substantially confined to a single corresponding multiview pixel 106 and the sub-pixels 106' thereof, i.e., a single set of light valves 108 corresponding to the microprism multibeam element 120, as illustrated in FIG. 2A. As such, each microprism multibeam element 120 of the multiview backlight 100 may provide a corresponding set of directional light beams 102 that has a principal angular direction in one of the different views of the multiview display (i.e., the set of directional light beams 102 contains light beams having a common direction in one of the different view directions).

According to various embodiments, microprism multibeam element 120 of the multiview backlight 100 is located at or adjacent to the first or top surface 110' of the light guide 110. In particular and by definition herein, the first surface 110' is a surface of the light guide 110 and also of the multiview backlight 100 that is configured to emit or provide the directional light beam plurality, e.g., as illustrated and described above. In some embodiments, the microprism multibeam element 120 is in contact with the top surface 110' of the light guide 110. Further, in some embodiments, a material of the microprism multibeam element 120 or more particularly a material of a microprism thereof is substantially similar to a material of the light guide 110. For example, the microprism may integral to and comprise material of the light guide 110. The microprism may be formed in or from a material (e.g., a surface material) of the light guide 110, for example. In other embodiments, the microprism may be provided separately from the light guide 110 and then subsequently position adjacent or attached thereto to provide contact with the top surface 110' of the light guide 110. In these embodiments, the microprism of the microprism multibeam element 120 may either comprise light guide material or another optical material, for example.

Figure 3:
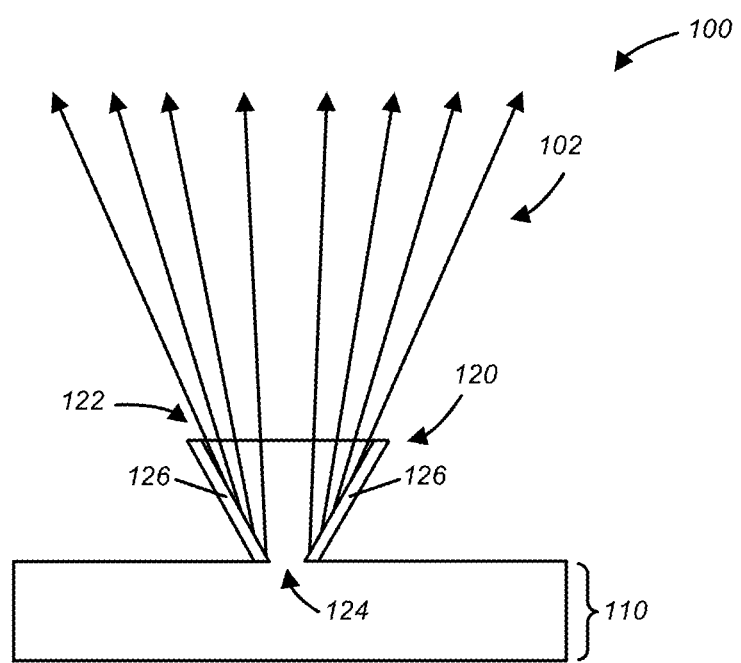
FIG. 3 illustrates a cross sectional view of a portion of a multiview backlight including a microprism multibeam element in an example, according to an embodiment consistent with the principles described herein.

FIG. 3 illustrates a cross sectional view of a portion of a multiview backlight 100 including a microprism multibeam element 120 in an example, according to an embodiment consistent with the principles described herein. In particular, FIG. 3 illustrates the microprism multibeam element 120 (or microprism thereof) attached to a portion of the light guide 110 of the multibeam backlight 100. Directional light beams 102 of the directional light beam plurality are illustrated as being emitted from an output aperture 122 of the microprism multibeam element 120. The directional light beams 102 are illustrated as being provided by reflection from an interior surface of the inclined sidewalls of the microprism multibeam element 120. Light that is reflected from the inclined sidewall interior surface is configured to enter the microprism multibeam element 120 from the light guide 110 at an input aperture 124. Further, as illustrated in FIG. 3 by way of example and not limitation, the microprism multibeam element 120 is integral to a light guide 110 of the multiview backlight 100. That is, a material of the light guide 110 is continuous across the input aperture 124 of the microprism multibeam element 120, as illustrated. FIG. 3 also illustrates a reflective material, reflective coating or reflective layer 126 on an exterior surface of the inclined sidewalls, according to an embodiment. Alternatively, reflection at the interior surface of the inclined sidewalls may be provided by total internal reflection, obviating a need for the reflective layer 126, in other embodiments. Note that, while the microprism multibeam element 120 in FIG. 3 is illustrated as a microprism having substantially straight inclined sidewalls, a variety of sidewall shapes may be used. For example, the inclined sidewalls may comprise a curved shape.

In addition, the output aperture 122 may have any of a variety of different shapes including, but not limited to, a square shape, a circular shape and a triangular shape. Likewise, the microprism of the microprism multibeam element 120 may have a shape resembling or substantially similar to a truncated cone, a truncated pyramid, and various other multi-sided structures, according to various embodiments. Further, an aspect ratio (e.g., a length vs. width) of the output aperture 122 is generally less than about three-to-one (i.e., a length that is less than three times a width), according to various embodiments. In particular, each of the width and the length of the microprism are generally less than or equal to the microprism multibeam element size.

Figure 4A:
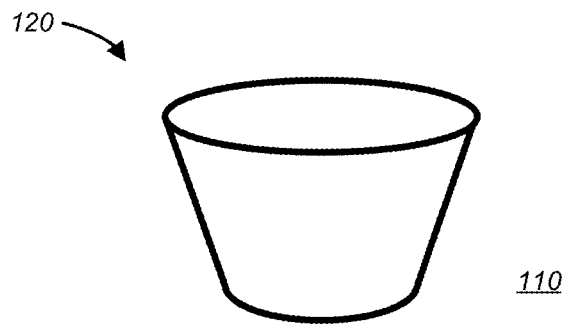
FIG. 4A illustrates a perspective view of a microprism multibeam element in an example, according to an embodiment consistent with the principles described herein.
Figure 4B:
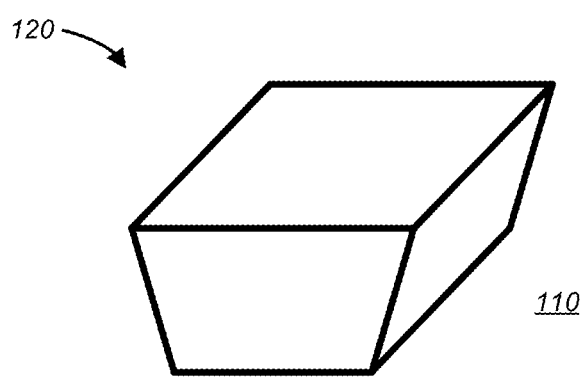
FIG. 4B illustrates a perspective view of a microprism multibeam element in an example, according to another embodiment consistent with the principles described herein.

FIG. 4A illustrates a perspective view of a microprism multibeam element 120 in an example, according to an embodiment consistent with the principles described herein. In particular, the illustrated microprism multibeam element 120 is comprises a microprism having a truncated conical shape. As illustrated, the microprism multibeam element 120 located on or adjacent to and extends from a surface of the light guide 110. FIG. 4B illustrates a perspective view of a microprism multibeam element 120 in an example, according to another embodiment consistent with the principles described herein. As illustrated in FIG. 4B, the microprism multibeam element 120 is comprises a microprism having a truncated pyramidal shape. For example, the microprism illustrated in FIG. 4B has a square truncated pyramidal shape. Further in FIG. 4B, the truncated pyramidal shaped microprism of the microprism multibeam element 120 is located on or adjacent to a surface of the light guide 110, as illustrated.

In addition to extracting a portion of the guided light 104 from the light guide 110 and providing the directional light beams 102 from the light guide 110, the microprism multibeam elements 120 also may be configured to modify or control an emission pattern of the plurality of directional light beams 102, in some embodiments. For example, the microprism multibeam elements 120 may serve to at least partially collimate the directional light beams 102. In addition, a specific shape of the microprism as well as a predetermined slope angle of the inclined sidewalls of the microprism multibeam element 120 may be configured to control a shape or extent of the emission pattern.

Figure 5A:
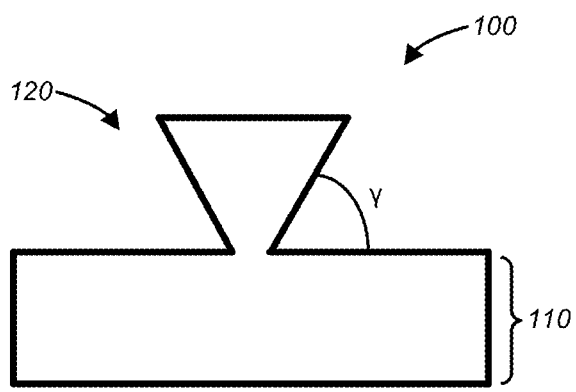
FIG. 5A illustrates a side view of a portion of a multiview backlight 100 including a microprism multibeam element 120 in an example, according to an embodiment consistent with the principles described herein.

FIG. 5A illustrates a side view of a portion of a multiview backlight 100 including a microprism multibeam element 120 in an example, according to an embodiment consistent with the principles described herein. In particular, FIG. 5A illustrates the microprism multibeam element 120 or equivalently a microprism thereof having inclined sidewalls with a slope angle $\gamma$. The slope angle may be specified relative to a surface plane of the light guide 110, for example. Varying the slope angle $\gamma$ facilitates controlling the emission pattern of the microprism multibeam element 120. In particular, the emission pattern may be a function of the slope angle of the inclined sidewalls, according to various embodiments. In some embodiments, the slope angle may range from about thirty degrees (30°) to about eighty degrees (80°). For example, slope angles $\gamma$ between about fifty degrees (50°) and about sixty-five degrees (65°) may be employed. Herein, the slope angle may be defined as an angle of the included sidewall relative to a surface plane of the light guide 110.

Figure 5B:
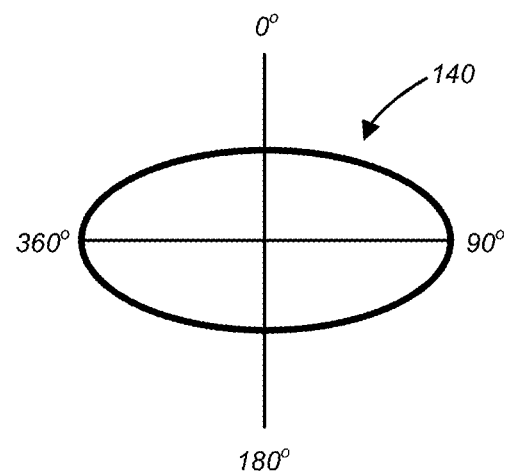
FIG. 5B illustrates a graphical representation of an elliptical-shaped emission pattern in an example, according to an embodiment consistent with the principles described herein.
Figure 5C:
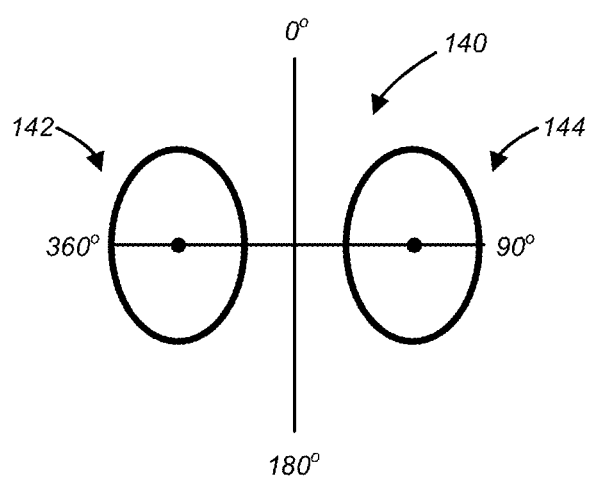
FIG. 5C illustrates a graphical representation of a bifurcated emission pattern in an example, according to another embodiment consistent with the principles described herein.

FIG. 5B illustrates a graphical representation of an elliptical-shaped emission pattern 140 in an example, according to an embodiment consistent with the principles described herein. The elliptical-shaped emission pattern 140 may result from a slope angle $\gamma$ of about sixty degrees (60°), for example. FIG. 5C illustrates a graphical representation of a bifurcated or two-lobe emission pattern 140 in an example, according to another embodiment consistent with the principles described herein. The bifurcated emission pattern 140 illustrated in FIG. 5C may include a first lobe 142 and a second lobe 144, as illustrated. The bifurcated emission pattern 140 of FIG. 5C may result from a slope angle $\gamma$ of about 50°, for example. In both instances illustrated in FIGS. 5B-5C, symmetrical illumination may be employed to achieve the illustrated emission patterns 140. Guided light 104 in the light guide 110 propagating in both the propagation direction 103 and the other propagation direction 103' as illustrated in FIG. 2A may provide symmetrical illumination, for example.

In yet other embodiments (not illustrated), the slope angle of the sidewalls of a microprism may differ for different locations around the microprism. For example, a slope angle of the sidewall on a first side of the microprism may be different from the sidewall slope angle on a second (e.g., an opposite) side of the microprism. In another example, the slope angle of the microprism sidewall may vary or be different at a plurality of different locations around the microprism. Different slope angles at different portions of the inclined sidewalls of the microprism may be used to provide a variety of asymmetrical or application-specific emission patterns, according to various embodiments.

In some embodiments, as mentioned above, the microprism multibeam element 120 of the multiview backlight 100 may comprise a plurality of microprisms. Further, in some embodiments, a density of microprisms within the microprism plurality may be configured to determine a relative brightness or emission intensity of the plurality of directional light beams 102 emitted or provided by the microprism multibeam element 120 at the output aperture thereof. The relative brightness may reflect a coupling efficiency of the microprism multibeam element 120, according to some embodiments.

In some embodiments, the density of microprisms is a function of a location of the microprism multibeam element 120 on the light guide 110, e.g., a distance from an edge or from a light source of the multiview backlight 100. For example, the microprism density may be used to maintain brightness uniformity along a length of the light guide 110 as a function of distance from the light source. In particular, an increase in the microprism density (i.e., more microprisms within the microprism multibeam element 120) may provide a concomitant increase in a relative brightness of the plurality of directional light beams 102 emitted by the microprism multibeam element 120, for example. On the other hand, a decrease in the microprism density (i.e., fewer microprisms within the microprism multibeam element 120) may yield a decrease in the relative brightness, for example. Control of the relative brightness using microprism density may be used to compensate for a decrease in available guided light 104 as a function of distance along the light guide 110 in a direction away from the light source. The relative brightness control, in turn, may be configured to provide a uniform brightness of directional light beam pluralities from a corresponding group of microprism multibeam elements 120, for example.

Figure 6A:
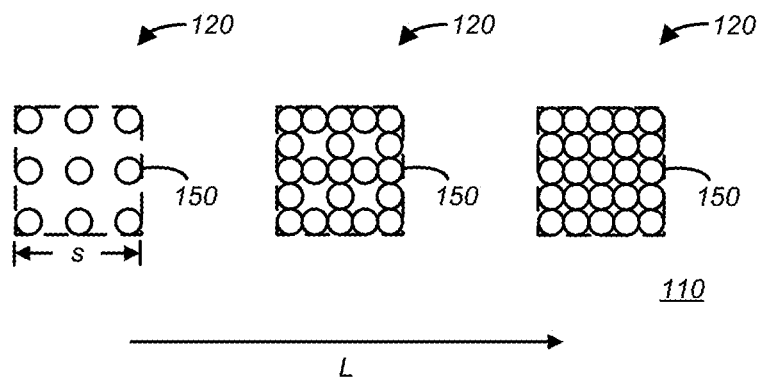
FIG. 6A illustrates a plan view of several microprism multibeam elements in an example, according to an embodiment consistent with the principles described herein.

FIG. 6A illustrates a plan view of several microprism multibeam elements 120 in an example, according to an embodiment consistent with the principles described herein. As illustrated in FIG. 6, each microprism multibeam element 120 (outlined by a dashed line) comprises a plurality of microprisms 150 located on a light guide 110. Further, as illustrated, a density of the microprisms 150 varies (i.e., increases) as a function of the distance L along the light guide 110. The distance L may be a distance from a light source, for example. The increasing microprism density may compensate for a general decrease in available guided light within the light guide 110 as a function of the distance L from the light source, for example. In addition, the shapes of the various microprisms 150 within and between the microprism multibeam elements 120 may be varied as well (not illustrated), according to some embodiments.

Figure 6B:
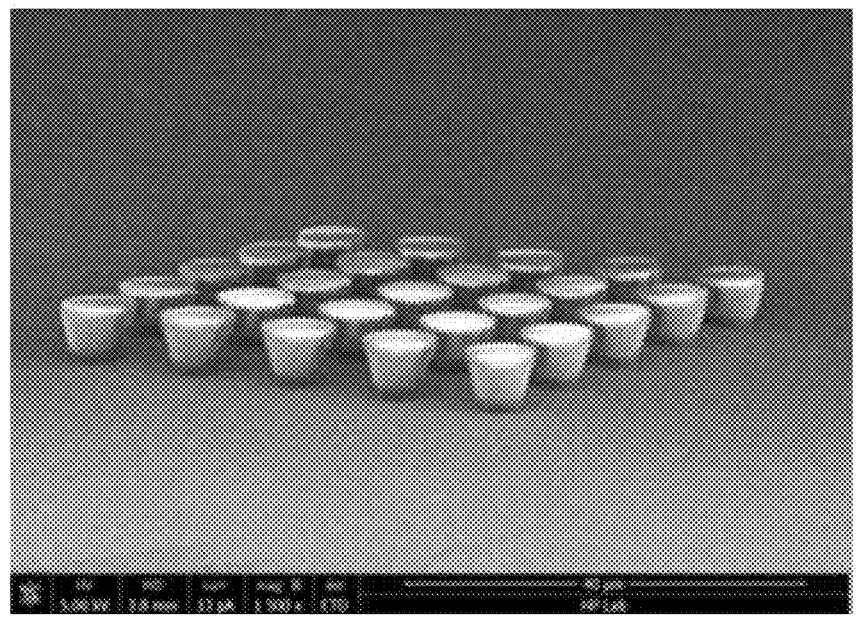
FIG. 6B is a scanning electron microscope (SEM) image of a microprism multibeam element in an example, according to an embodiment consistent with the principles described herein.

FIG. 6B is a scanning electron microscope (SEM) image of a microprism multibeam element 120 in an example, according to an embodiment consistent with the principles described herein. The microprism multibeam element 120 in the SEM image includes a plurality of microprisms in a rectangular array (e.g., a five-by-five array). For example, the microprism multibeam element and microprisms in FIG. 6B may represent a microprism multibeam element 120 and associated microprisms 150 illustrated in FIG. 6A, e.g., a right-most microprism multibeam element 120, as illustrated.

Referring again to FIGS. 2A and 2C, Referring again to FIG. 2A, the multiview backlight 100 may further comprise a light source 130. According to various embodiments, the light source 130 is configured to provide the light to be guided within light guide 110. In particular, the light source 130 may be located adjacent to an entrance surface or end (input end) of the light guide 110. In various embodiments, the light source 130 may comprise substantially any source of light (e.g., optical emitter) including, but not limited to, one or more light emitting diodes (LEDs) or a laser (e.g., laser diode). In some embodiments, the light source 130 may comprise an optical emitter configured produce a substantially monochromatic light having a narrowband spectrum denoted by a particular color. In particular, the color of the monochromatic light may be a primary color of a particular color space or color model (e.g., an RGB color model). In other examples, the light source 130 may be a substantially broadband light source configured to provide substantially broadband or polychromatic light. For example, the light source 130 may be configured to provide white light. In some embodiments, the light source 130 may comprise a plurality of different optical emitters configured to provide different colors of light. The different optical emitters may be configured to provide light having different, color-specific, non-zero propagation angles of the guided light corresponding to each of the different colors of light.

In some embodiments, the light source 130 may further comprise a collimator. The collimator may be configured to facilitate efficient coupling of light into light guide 110, for example. The collimator is configured to receive substantially uncollimated light from one or more of the optical emitters of the light source 130. The collimator is further configured to convert the substantially uncollimated light into collimated light. In particular, the collimator may provide collimated light having the non-zero propagation angle and being collimated according to a predetermined collimation factor σ, according to some embodiments. The collimator is further configured to communicate the collimated light beam to the light guide 110 to propagate as the guided light 104, described above. However, the microprism multibeam elements 120 do not require the use of collimated light. Therefore, in some embodiments substantially uncollimated light is provided by the light source 130.

In accordance with some embodiments of the principles described herein, a multiview display is provided. The multiview display is configured to emit modulated light beams as pixels of the multiview display. Further, the emitted modulated light beams may be preferentially directed toward a plurality of viewing directions of the multiview display. In some examples, the multiview display is configured to provide or 'display' a 3D or multiview image. Different ones of the modulated, differently directed light beams may correspond to individual pixels of different 'views' associated with the multiview image, according to various examples. The different views may provide a 'glasses free' (e.g., autostereoscopic) representation of information in the multiview image being displayed by the multiview display, for example.

Figure 7:
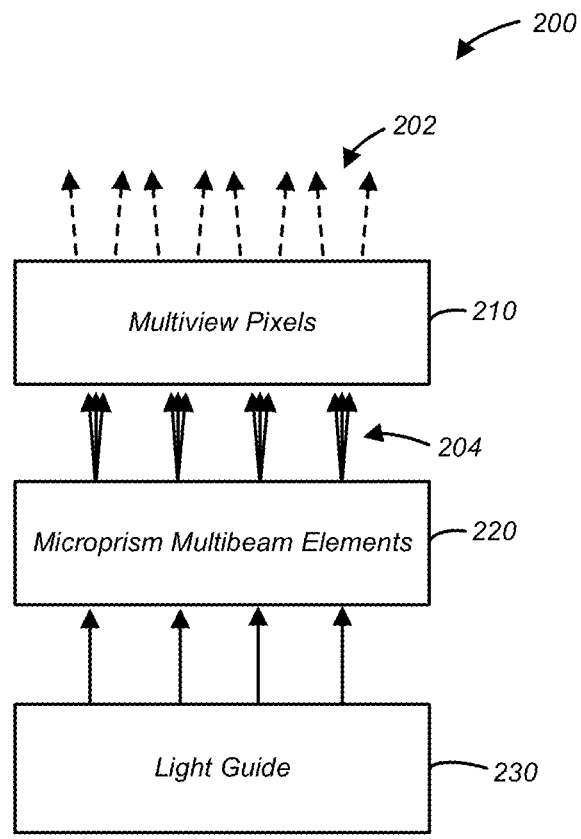
FIG. 7 illustrates a block diagram of a multiview display in an example, according to an embodiment consistent with the principles described herein.

FIG. 7 illustrates a block diagram of a multiview display 200 in an example, according to an embodiment consistent with the principles described herein. According to various embodiments, the multiview display 200 is configured to display a multiview image according to different views in different view directions. In particular, modulated directional light beams 202 emitted by the multiview display 200 are used to display the multiview image and may correspond to pixels of the different views (i.e., view pixels). The modulated directional light beams 202 are illustrated as arrows emanating from multiview pixels 210 in FIG. 7. Dashed lines are used for the arrows of the emitted modulated directional light beams 202 to emphasize the modulation thereof by way of example and not limitation.

The multiview display 200 illustrated in FIG. 7 comprises an array of the multiview pixels 210. The multiview pixels 210 of the array are configured to provide a plurality of different views of the multiview display 200. According to various embodiments, a multiview pixel 210 of the array comprises a plurality of sub-pixels configured to modulate a plurality of directional light beams 204 and produce the emitted modulated directional light beams 202. In some embodiments, the multiview pixel 210 is substantially similar to a set of light valves 108 of the array of light valves 108, described above with respect to the multiview backlight 100. In particular, a sub-pixel of the multiview pixel 210 may be substantially similar to the above-described light valve 108. That is, a multiview pixel 210 of the multiview display 200 may comprises a set of light valves (e.g., a set of light valves 108), and a sub-pixel of the multiview pixel 210 may comprise a light valve (e.g., a single light valve 108) of the set.

According to various embodiments, the multiview display 200 illustrated in FIG. 7 further comprises an array of microprism multibeam elements 220. Each microprism multibeam element 220 of the array is configured to provide the plurality of directional light beams 204 to a corresponding multiview pixel 210. Directional light beams 204 of the plurality of directional light beams 204 have different principal angular directions from one another. In particular, the different principal angular directions of the directional light beams 204 correspond to different view directions of the different views of the multiview display 200.

According to various embodiments, a size of a microprism multibeam element 220 of the microprism multibeam element array is comparable to a size of a sub-pixel of the sub-pixel plurality. For example, the size of the microprism multibeam element 220 may be greater than one half of the sub-pixel size and less than twice the sub-pixel size, in some embodiments. Further, an inter-element distance between microprism multibeam elements 220 of the microprism multibeam element array may correspond to an inter-pixel distance between multiview pixels 210 of the multiview pixel array, according to some embodiments. For example, the inter-element distance between the microprism multibeam elements 220 may be substantially equal to the inter-pixel distance between the multiview pixels 210. In some examples, the inter-element distance between microprism multibeam elements 220 and the corresponding inter-pixel distance between multiview pixels 210 may be defined as a center-to-center distance or an equivalent measure of spacing or distance.

Further, there may be a one-to-one correspondence between the multiview pixels 210 of the multiview pixel array and the microprism multibeam elements 220 of the microprism multibeam element array. In particular, in some embodiments, the inter-element distance (e.g., center-to-center) between the microprism multibeam elements 220 may be substantially equal to the inter-pixel distance (e.g., center-to-center) between the multiview pixels 210. As such, each sub-pixel in the multiview pixel 210 may be configured to modulate a different one of the plurality of directional light beams 204 provided by a corresponding microprism multibeam element 220. Further, each multiview pixel 210 may be configured to receive and modulate the directional light beams 204 from one and only one microprism multibeam element 220, according to various embodiments.

In some embodiments, the microprism multibeam element 220 of the microprism multibeam element array may be substantially similar to the microprism multibeam element 120 of the multiview backlight 100, described above. For example, the microprism multibeam element 220 may comprise one or more microprisms.

The multiview display 200 further comprises a light guide 230 configured to guide light. The microprism multibeam elements 220 of the element array are configured to couple out a portion of the guided light from the light guide 230 as the plurality of directional light beams 204 provided to the corresponding multiview pixels 210, according to these embodiments. In particular, the microprism multibeam element 220 may be optically connected to the light guide 230 to couple out the portion of the guided light. In some embodiments, the light guide 230 of the multiview display 200 may be substantially similar to the light guide 110 described above with respect to the multiview backlight 100.

Further, in some of these embodiments (not illustrated in FIG. 7), the multiview display 200 may further comprise a light source. The light source may be configured to provide the light to the light guide. According to some embodiments, the light source may be substantially similar to the light source 130 of the multiview backlight 100, described above.

Figure 8:
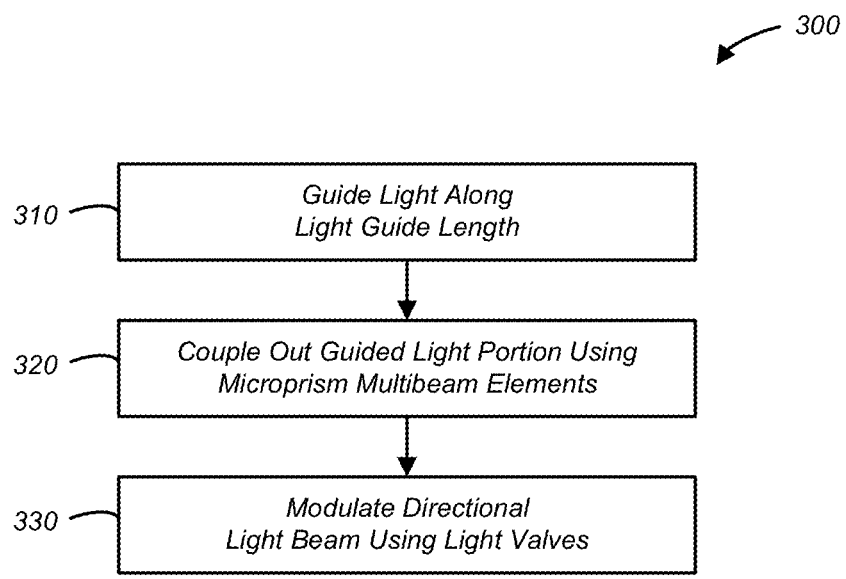
FIG. 8 illustrates a flow chart of a method of multiview display operation in an example, according to an embodiment consistent with the principles described herein.

In accordance with other embodiments of the principles described herein, a method of multiview display operation is provided. FIG. 8 illustrates a flow chart of a method 300 of multiview display operation in an example, according to an embodiment consistent with the principles described herein. As illustrated in FIG. 8, the method 300 of multiview display operation comprises guiding 310 light along a length of a light guide. Further, the guided light may be collimated according to a predetermined collimation factor. According to some embodiments, the light guide may be substantially similar to the light guide 110 described above with respect to the multiview backlight 100.

The method 300 of multiview display operation further comprises coupling 320 a portion of the guided light out of the light guide using a plurality of microprism multibeam elements adjacent to and extending from a surface of the light guide. In particular, a microprism multibeam element of the microprism multibeam element plurality may extend from a top or emitting surface of the light guide. In various embodiments, guided light portion that is coupled 320 out is emitted by a microprism multibeam element of the plurality of microprism multibeam elements as a plurality of directional light beams having different principal angular directions from one another. Further, the different principal angular directions of the directional light beams of the directional light beam plurality correspond to view directions of different views of a multiview display, in various embodiments.

In particular, as part of coupling 320 out, a microprism multibeam element receives the guided light portion at an input aperture of the microprism multibeam element. Further, the microprism multibeam element emits or provides the plurality of directional light beams at an output aperture by reflecting the received guided light portion from an inclined sidewall of a microprism of the microprism multibeam element. The light reflected from the inclined sidewall then exits the microprism multibeam element through the output aperture thereof as the directional light beam plurality. In some embodiments, the microprism multibeam element (and microprism thereof) is substantially similar to the microprism multibeam elements 120 of the multiview backlight 100, described above. Further, a product of coupling 320 out is the plurality of directional light beams emitted by the microprism multibeam elements, according to various embodiments.

For example, microprism multibeam elements of the microprism multibeam element plurality include one or more microprism having the inclined sidewall. The microprism multibeam elements may couple 320 out the plurality of light beams by reflection from the inclined sidewall. In some embodiments, the inclined sidewall of the microprism multibeam element may include a reflective layer disposed on an exterior surface of the microprism to facilitate reflection. According to various embodiments, a microprism multibeam element of the microprism multibeam element plurality is comparable to a size of a sub-pixel in a multiview pixel of a multiview display. Thus, a size of the microprism multibeam element may be greater than one half of the sub-pixel size and less than twice the sub-pixel size.

In some embodiments (not illustrated), the method 300 of multiview display operation further comprises providing light to the light guide using a light source. The provided light may be the guided light that is collimated within the light guide according to a collimation factor to provide a predetermined angular spread of the guided light within the light guide. In some embodiments, the light source may be substantially similar to the light source 130 of the multiview backlight 100, described above.

As illustrated in FIG. 8, the method 300 of multiview display operation further comprises optionally modulating 330 the directional light beams using light valves configured as a multiview pixel of a multiview display. According to some embodiments, a light valve of a plurality or array of light valves corresponds to a sub-pixel of the multiview pixel. That is, the microprism multibeam element may have a size comparable to a size of the light valve or a center-to-center spacing between the light valves of the plurality for a group of one or more sub-pixels, for example.

According to some embodiments, the plurality of light valves may be substantially similar to the array of light valves 108 described above with respect to FIGS. 2A-2C and the multiview backlight 100. In particular, different sets of light valves may correspond to different multiview pixels in a manner similar to the correspondence of the first and second light valve sets 108a, 108b to different multiview pixels 106, as described above. Further, individual light valves of the light valve array may correspond to a group of one or more color sub-pixels or the sub-pixels that include groups of color sub-pixels of the multiview pixels as a light valve 108 corresponds to a sub-pixel 106' in the above-reference discussion of FIGS. 2A-2C.

Thus, there have been described examples and embodiments of a multiview backlight, a method of multiview display operation, and a multiview display that employ microprism multibeam elements comprising one or more microprisms having an inclined sidewall. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A multiview backlight, comprising:
a light guide configured to guide light as guided light; and
a microprism multibeam element adjacent to and extending from a surface of the light guide, the microprism multibeam element having an input aperture configured to receive a portion of the guided light and an output aperture configured to emit a plurality of directional light beams having principal angular directions corresponding to view directions of a multiview display, wherein the microprism multibeam element comprises a plurality of microprisms, a microprism of the plurality of microprisms having an inclined sidewall configured to reflect the received guided light portion and provide the plurality of directional light beams, the microprism multibeam element having a size comparable to a size of a sub-pixel of a multiview pixel in a multiview display.

2. The multiview backlight of claim 1, wherein a slope angle of the inclined sidewall is configured to control an emission pattern of the plurality of directional light beams.

3. The multiview backlight of claim 2, wherein the slope angle is between about fifty degrees and about sixty-five degrees.

4. The multiview backlight of claim 1, wherein the microprism of the microprism multibeam element has a width and a length, each of the width and the length being less than the size of the microprism multibeam element.

5. The multiview backlight of claim 4, wherein the microprism of the microprism multibeam element has a truncated conical shape.

6. The multiview backlight of claim 4, wherein the microprism of the microprism multibeam element has a truncated pyramidal shape.

7. The multiview backlight of claim 1, wherein a density of microprisms of the microprism plurality being is configured to determine a relative emission intensity of the plurality of directional light beams at the output aperture of the microprism multibeam element.

8. The multiview backlight of claim 7, wherein the density of microprisms is a function of a location of the microprism multibeam element on the light guide.

9. The multiview backlight of claim 1, wherein the microprism multibeam element comprises a material of the light guide.

10. The multiview backlight of claim 1, wherein the inclined sidewall of the microprism of the microprism multibeam element comprises a reflective material layer.

11. The multiview backlight of claim 1, further comprising a light source optically coupled to an input of the light guide, the light source being configured to provide light to be guided as the guided light.

12. The multiview backlight of claim 11, wherein the light provided by the light source one or both of has a non-zero propagation angle and is collimated according to a predetermined collimation factor.

13. A multiview display comprising the multiview backlight of claim 1, the multiview display further comprising an array of light valves configured to modulate directional light beams of the plurality of directional light beams, a light valve of the array corresponding to the sub-pixel in the multiview pixel, a set of light valves of the array corresponding to the multiview pixel of the multiview display.

14. A multiview display comprising:
an array of multiview pixels configured to provide a plurality of different views of the multiview display, a multiview pixel comprising a plurality of light valves configured to modulate a plurality of directional light beams having different principal angular directions corresponding to view directions of different views of the plurality of different views;
a light guide configured to guide light as guided light; and
an array of microprism multibeam elements extending from a surface of the light guide, a microprism multibeam element of the microprism multibeam element array comprising a plurality of microprisms, wherein a microprism of the plurality of microprisms is configured to receive a portion of the guided light and has an inclined sidewall configured to reflect the received portion to provide the plurality of directional light beams at an output aperture of the microprism multibeam element.

15. The multiview display of claim 14, wherein a size of the microprism multibeam element is between one half and two time a size of a light valve of the plurality of light valves.

16. The multiview display of claim 14, wherein each of the microprism multibeam elements of the microprism multibeam element array includes a plurality of microprisms, a number of microprisms in each microprism multibeam elements being a function of length along the light guide to reduce variation in a brightness of the directional light beams along the light guide length.

17. The multiview display of claim 14, further comprising a light source optically coupled to an input of the light guide or light sources optically coupled to inputs of the light guide, the light source or the light sources being configured to provide light to be guided as the guided light.

18. A method of multiview display operation, the method comprising:
guiding light along a length of a light guide as guided light; and
coupling out a portion of the guided light from the light guide using a plurality of microprism multibeam elements extending from a surface of the light guide, the coupled-out guided light portion being emitted by a microprism multibeam element of the plurality of microprism multibeam elements as a plurality of directional light beams having different principal angular directions from one another corresponding to view directions of different views of the multiview display, wherein the microprism multibeam element comprises a plurality of microprisms, a microprism of the plurality of microprisms having an inclined sidewall, the microprism multibeam element having a one-to-one correspondence with a multiview pixel.

19. The method of multiview display operation of claim 18, wherein the microprism multibeam element has a size comparable to a size of a light valve of the multiview display.

20. The method of multiview display operation of claim 18, wherein the microprism of the microprism multibeam element has one of a truncated conical shape and a truncated pyramidal shape.

21. The method of multiview display operation of claim 18, the method further comprising modulating directional light beams of the plurality of directional light beams using a plurality of light valves configured as a multiview pixel of the multiview display.

\* \* \* \* \*